United States Patent [19]

Finter et al.

[11] Patent Number: 5,324,791

[45] Date of Patent: Jun. 28, 1994

[54] ANTISTATIC AND ELECTRICALLY CONDUCTING COMPOSITION

[75] Inventors: Jürgen Finter, Freiburg, Fed. Rep. of Germany; Bruno Hilti, Basle, Switzerland; Carl W. Mayer, Reihen, Switzerland; Ernst Minder, Sissach, Switzerland

[73] Assignee: Ciba-Geigy Corporation, Ardsley, N.Y.

[21] Appl. No.: 991,678

[22] Filed: Dec. 16, 1992

Related U.S. Application Data

[62] Division of Ser. No. 411,950, Sep. 25, 1989, Pat. No. 5,200,113.

[30] Foreign Application Priority Data

Sep. 30, 1988 [CH] Switzerland .......................... 3639/88

[51] Int. Cl.$^5$ .............................................. C08F 8/20
[52] U.S. Cl. ............................. 525/330.1; 525/330.3; 525/359.3; 525/359.4; 526/292.1; 526/292.4; 526/292.5; 526/292.7
[58] Field of Search ................... 525/330.1, 330.3; 526/292.1, 292.4, 292.5, 292.7

[56] References Cited

U.S. PATENT DOCUMENTS

| | | | |
|---|---|---|---|
| 2,021,763 | 11/1935 | Bauer et al. | 525/330.1 |
| 2,511,424 | 6/1950 | Babayan | 525/330.1 |
| 3,403,165 | 9/1968 | Matsunaga et al. | |
| 3,636,048 | 1/1972 | Klingsberg | |
| 4,384,025 | 5/1983 | Hilti et al. | |
| 4,522,754 | 6/1985 | Hilti et al. | |
| 4,601,853 | 7/1986 | Hilti et al. | |
| 4,617,151 | 10/1986 | Mayer et al. | |
| 4,801,701 | 1/1989 | Hilti et al. | |
| 5,009,812 | 4/1991 | Finter et al. | |
| 5,015,558 | 5/1991 | Ochi et al. | 525/330.3 |

FOREIGN PATENT DOCUMENTS

| | | |
|---|---|---|
| 3005849 | 9/1981 | Fed. Rep. of Germany . |
| 3335513 | 4/1985 | Fed. Rep. of Germany . |
| 3635124 | 4/1987 | Fed. Rep. of Germany . |

OTHER PUBLICATIONS

Organometallics 1984, 3, 732–735.
Pure & Appl. Chem, vol. 56, No. 3, pp. 355–368 1984.

*Primary Examiner*—Bernard Lipman
*Attorney, Agent, or Firm*—George R. Dohmann

[57] ABSTRACT

The action of thermoplastic polymers to whose polymer backbone aliphatic or cycloaliphatic groups are bonded via a group —O—, —O—CO—, —CO—OR$^2$-2—OCO— or —CO—O—, said aliphatic or cycloaliphatic groups being substituted by Cl, Br and/or iodine in the $\alpha$-, $\beta$-, $\gamma$- or $\omega$-position, on an unsubstituted or substituted tetrathio-, tetraseleno- or tetratelluronaphthalene or -tetracene contained in this polymer gives electrically conducting compositions by the formation of charge transfer complexes. These compositions are suitable for the production of antistatic or electrically conducting mouldings, sheets, filaments, fibres, coatings and composites.

13 Claims, No Drawings

ANTISTATIC AND ELECTRICALLY CONDUCTING COMPOSITION

This is a divisional of Ser. No. 07/411,950, filed Sep. 25, 1989, U.S. Pat. No. 4,200,113.

The invention relates to a composition of a) a thermoplastic polymer containing active Cl, Br and/or I atoms, and b) a substituted or unsubstituted tetrathio-, tetraseleno or tetratelluro-naphthalene or -tetracene or mixtures thereof, to a composition containing said polymer and a charge transfer complex (CT complex) of these naphthalenes and tetracenes and Cl, Br and/or I, to a process for the preparation of this composition and to the use thereof for the production of antistatic or electrically conducting mouldings, filaments, fibres, sheets, coatings and composite.

German patent application A-3005849 discloses electrically conducting moulding compounds consisting of a thermoplastic and a CT complex, these CT complexes being in the form of fibres and needles. Compounds containing N, O and/or S are used as electron donors and polycyano compounds are used as electron acceptors. The moulding compounds can be prepared by adding the acceptor to a polymer solution in which the donor is dissolved, and then evaporating off the solvent. In Pure and Applied Chemistry, vol. 56, no. 3, pages 355–368 (1984), M Kryszewski et al. described electrically conducting polymer compositions containing, as CT complexes, those consisting of tetrathiotetracene as elecontron donor and tetracyanoquinodimethane, tetracyanoethylene or chloranil as electron acceptor. The electrical conductivity of these systems is low on account of the relatively low conductivity of the pure CT complexes.

The stability of the CT complexes with tetracyanoquinodimethane is low. It is known that these CT complexes have to be stabilized against HCN elimination, q.v. German patent application A-3335513.

In Organometallica, 3, p. 732–735 (1984), J. C. Stark et al. describe peridichalcogenated polyacenes, certain salts of which possess a high electrical conductivity. Such halides are described in U.S. Pat. Nos. 4,384,025 and 4,522,754, German Offenlegungsschriften 3 510 072 and 3 635 124 and European patent application A-O 153 905. These halides generally melt above 300° C. They are also practically insoluble in organic solvents. Because of these properties, the halides can only be incorporated in the form of powders into polymers. Such polymer compositions have a very low electrical conductivity since the conducting particles are isolated in the polymer matrix.

The present invention relates to a composition comprising a) a thermoplastic polymer soluble in an inert organc solvent, which contains aliphatic or cycloaliphatic side groups bonded to a polymer backbone via a group —O—, —O—CO—, —CO—OR$^{22}$—OCO— or —CO—O—, said side groups containing at lest one Cl, Br or I atom in the $\alpha$-, $\beta$-, $\gamma$- or $\omega$-position, R$^{22}$ being $C_2$-$C_{12}$alkylene, $C_4$-$C_{12}$cycloalkylene, $C_4$-$C_{12}$cycloalkylene-$CH_2$-, $C_4$-$C_{12}$cycloalkylene-$(CH_2)_2$—, benzylene or xylene which is unsubstituted or substituted by OH, Cl, Br or phenyl, and b) a charge transfer complex (CT complex) formed of chlorine, bromine or iodine and a compound of formula I or Ia

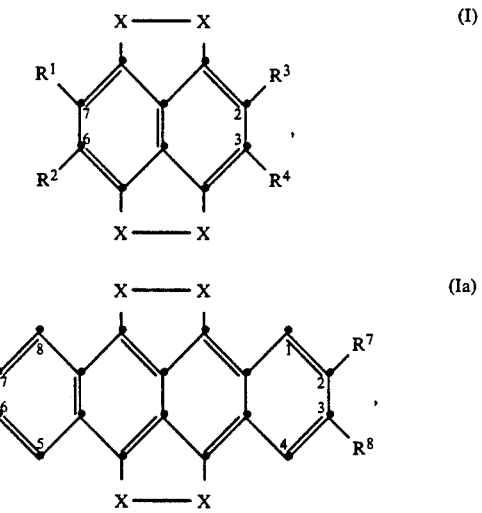

or mixtures thereof, wherein X is S, Se or Te, R$^1$, R$^2$, R$^3$ and R$^4$ are independently of the others a hydrogen atom or Cl, or R$^1$ and R$^2$, and R$^3$ and R$^4$, together are each

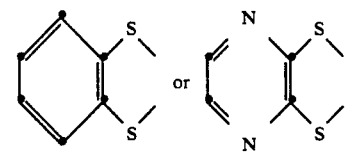

R$^1$, R$^2$, R$^3$ and R$^4$ are each phenylthio, 4-methylphenylthio, 4-methoxyphenylthio or pyrid-4-ylthio, and R$^5$, R$^6$, R$^7$ and R$^8$ are independently of the others H or F, or R$^5$ is $CH_3$ and R$^6$, R$^7$ and R$^8$ are H, or R$^5$, R$^6$, R$^7$ and R$^8$ are $CH_3$ or Cl and R$^7$ and R$^8$ are H, or R$^5$ and R$^6$ and H, R$^7$ is —COR$^9$ and R$^8$ is H or —COR$^9$, or R$^5$ and R$^6$ are H and R$^7$ and R$^8$ together are —CO—O—CO— or —CO—NR$^{10}$—CO—, wherein R$^9$ is halogen, —OH, —NH$_2$, the radical of an alcohol or of primary or secondary amine, or —OM, M being a cation, and R$^{10}$ is H or the radical of a primary amine from which the NH$_2$ group has been removed.

Component b) is preferably present in an amount of 0.01 to 20% by weight, more preferably 0.05 to 10% by weight and most preferably 0.1 to 5% by weight, based on polymer a).

Some of the compounds of component b) and their preparation are described in the afore-mentioned publications. Preferred CT complexes of component b) are those formed of compounds of formula Ia and especially of tetrathiotetracene, tetraselenotetracene or 2-fluoro- or 2,3-difluoro-tetraselenotetracene.

The CT complex formed of Cl and a compound of formula Ia is especially preferred. The CT complex of component b) is (tetraselenotetracene)$_2$Cl in particular.

In a preferred embodiment, the CT complex of component b) is in the form of a needle network of crystal needles.

The novel compounds of formula II or IIa

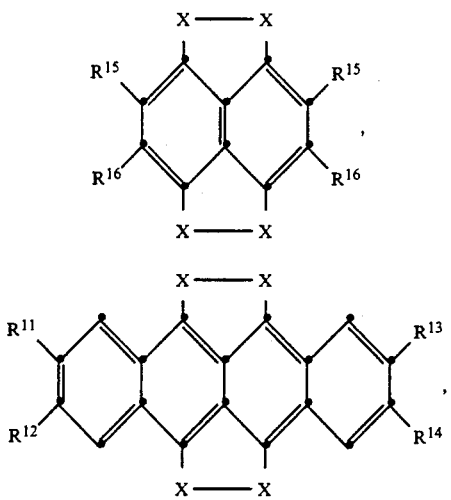

(II)

(IIa)

wherein $R^{15}$ and $R^{16}$ are phenylthio, 4-methylphenylthio, 4-methoxyphenylthio or pyrid-4-ylthio, or wherein $R^{15}$ and $R^{16}$ together are

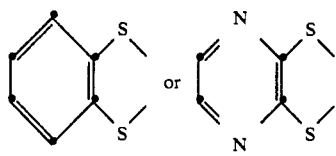

or $R^{11}$ is —$CH_3$ and $R^{12}$, $R^{13}$ and $R^{14}$ are H, or $R^{11}$ and $R^{12}$ are Cl, or $CH_3$ and $R^{13}$ and $R^{14}$ are H, or $R^{11}$, $R^{12}$, $RR^{13}$ and $R^{14}$ are —$CH_3$ or F, and X is S, Se or Te can be prepared e.g. as described below:

a) Tetramethyltetracenes

The known starting compounds 4,5-dimethylphthalic anhydide and 2,3-dimethyl-6,7-dihydroxynaphthalene are reacted in the presence of $B_2O_3$ to give 2,3,8,9-tetramethyl-5,12-dihydroxy-6,12-dioxotetracene (A). This reaction and the subsequent chlorination and reduction to give the product tetrachlorinated in the 5-, 6-, 11- and 12-positions are described in German Offenlegungsschrift 3635124. Reaction with $Na_2H_x$ yields the corresponding tetrachalcogenated tetracene. In a variant, 2,3,8,9-tetramethyl-5,5,6,11,12,12-hexachlorodihydrotetracene (obtained on chlorination with $PCl_5/POCl_3$) can be reacted with 1 equivalent of $Na_2Se_2$ and 2 equivalents of $Na_2Se$ to give the corresponding tetraselenotetracene direct. Compound A can also be alkylated with dimethyl sulfate to give the 5,12-dimethoxy derivative [q.v. Chem. Pharm. Bull. 20(4), 827 (1972)]. Reaction of this derivative with $P_4S_{10}$ in tetrahydrofuran, followed by oxidation with $Br_2$ and then reduction with $TiCl_3$ yields 2,3,8,9-tetramethyl-5,6,11,12-tetrathiotetracene.

b) 2-Methyltetracenes

2-Methyl-5,12-dioxodihydrotetracene is obtained according to the instructions in Chem. Ber. 64, 1713 (1931). Reduction with Zn in alkaline solution yields 2-methyl-5,12-tetrahydrotetracene, which can be dehydrogenated with chloranil to give 2-methyltetracene. Reaction with S (see. U.S. Pat. No. 3,723,417) gives 2-methyl-5,6,11,12-tetrathiotetracene. Another possibility is t prepare 2-methyl-5,6,11,12-tetrachlorotetracene as described in a) and react it with $Na_2X_2$.

c) Tetrafluorotetracenes

According to the instructions in Chem. Ber. 31, 1159 and 1272 (1898), 2,3,8,9-tetrafluoro-5,12-dihydroxy-6,12-dioxotetracene (B) is obtained by condensing 2,3-difluorophthalic anhydride with succinic acid and then treating the condensation product with sodium ethylate in ethanol. Further reaction with $PCl5$ and then with $SnCl12/CH3COOH$ to give 2,3,8,9-tetrafluoro-5,6,11,12-tetrachlorotetracene is carried out analogously to the instructions in Zhuv. Org. Kim. 15(2), 391 (1979). Reaction with $Na_2X_x$ gives the corresponding 2,3,8,9-tetrafluorotetrachalcogenotetracenes. Reduction of compound B with Al in cyclohexanol yields 2,3,8,9-tetrafluorotetracene, which reacts with sulfur [see Bull. Soc. Chim. 15, 27 (1948)] to give 2,3,8,9-tetrafluoro-5,6,11,12-tetrathiotetracene.

d) Naphthalenes

Starting from known 2,3,6,7-tetrachlorotetrachalcogenonaphthalenes (see U.S. Pat. No. 3,769,276), it is possible to obtain the corresponding 2,3,6,7-substituted tetrachalcogenonaphthalenes by reaction with the potassium salts of thiophenol, 4-methylthiophenol, 4-methoxythiophenol, 4-mercaptopyridine, 1,2-benzodithiol or pyrazine-2,3-dithiol.

e) Dimethyl- and dichloro-tetracenes

The procedure is analogous to that described under a), except that 4,5-dimethyl- and 4,5-dichloro-phthalic anhydrides are reacted with 6,7-dihydroxynaphthalene as starting compounds and chlorination is carried out with $PCl_5/POCl_3$.

In formulas I, Ia, II and IIa, X is preferably S or Se. $R^9$ as halogen is especially chlorine.

In the radical —OH, M can be a metal or ammonium cation. Typical metal cations are especially those of the alkali metals and alkaline earth metals, e.g. $Li^+Na^+$, $K^+$, $Mg^{2+}$, $Ca^{2+}$, $Sr^{2+}$ and $Ba^{2+}$. $Zn^{2+}$ and $Cd^{2+}$ are also suitable. Examples of typical ammonium cations are $NH_4^+$ and primary, secondary, tertiary or quaternary ammonium, which can preferably contain $C_1$-$C_{12}$alkyl, cyclohexyl, cyclopentyl, phenyl or benzyl groups. The ammonium cations can also be derived from 5- or 6-membered heterocyclic amines, e.g. piperidine, pyrrole and morpholine.

$R^9$ as the radical of an alcohol is preferably $C_1$-$C_6$alkoxy or $C_2$-$C_6$-hydroxyalkoxy, benzyloxy, phenoxy, cyclopentoxy or cyclohexyloxy.

$R^9$ as the radical of a primary or secondary amine is preferably derived from alkylamines containing one or two $C_1$-$C_6$alkyl groups.

$R^{10}$ is preferably H, $C_1$-$C_{18}$alkyl, phenyl or benzyl.

$R^{10}$ as alkyl preferably contains 1 to 12 and especially 1 to 6 C atoms.

Examples of alkyl, which can be linear or branched, are: methyl, ethyl, n- or i-propyl, n-, i- or t-butyl, pentyl, hexyl, 2-ethylhexyl, heptyl, octyl, nonyl, decyl, undecyl and dodecyl.

Examples of alkoxy and hydroxyalkoxy are: methoxy, ethoxy, propoxy, butoxy, pentoxy, hexyloxy, β-hydroxyethoxy, γ-hydroxypropoxy, δ-hyudroxybutoxy and ω-hydroxyhexyloxy.

In a preferred embodiment, the composition contains up to 95% by weight, based on polymer a), of at least one thermoplastic or elastomer polymer differing from component a). In particular, the composition contains up to 80% by weight of the additional polymer.

The additional polymers are advantageously inert towards the compounds of component b). The polymers therefore preferably contain essentially no strongly acidic groups, e.g. carboxyl groups, or strongly basic groups, e.g. primary or secondary amine groups. The polymers can be e.g. thermoplastics or elastomers.

In a preferred embodiment, the thermoplastic polymers are polymers of monoolefins and diolefins; copolymers of monolefins and/or diolefins; polystyrene, poly(p-methylstyrene) or poly($\alpha$-methylstyrene); copolymers of styrene or $\alpha$-methylstyrene; graft copolymers of styrene or $\alpha$-methylstyrene; halogen-containing polymers; polymers and copolymers of derivatives of $\alpha,\beta$-unsaturated acids; polymers derived from acyl derivatives or acetates of unsaturated alcohols; homopolymers and copolymers of cyclic ethers; polyacetals; polyphenylene oxides and sulfides and mixtures thereof with styrene polymers; polyurethanes; polyureas; polyimides; polybenzimidazoles; polycarbonates; polyesters; polyester-carbonates; polysulfones; polyether-sulfones; polyether-ketones; polyvinylcarbazole; polyadducts of unsubstituted or hydroxyalkylated epoxy compounds containing an average of more than one epoxy group per molecule, and diols, primary monoamines, disecondary diamines, disecondary linear or cyclic dicarboxylic acid diamides or dicarboxylic acids; cellulose derivatives; sulfur-crosslinked products derived from polymers containing double bonds; and mixtures of the afore-mentioned polymers.

Examples of polymers are:

1. Polymers of monoolefins and diolefins, for example polypropylene, polyisobutylene, polybut-1-ene, polymethylpent-1-ene, polyisoprene or polybutadiene, and polymers of cycloolefins such as cyclopentene or norbornene, and also polyethylene, e.g. high density polyethylene (HDPE), low density polyethylene (LDPE) or linear low density polyethylene (LLDPE).

2. Mixtures of the polymers mentioned under 1), e.g. mixtures of polypropylene with polyisobutylene and polypropylene with polyethylene (e.g. PP/HDPE, PP/LDPE) and mixtures of different types of polyethylene (e.g. LDPE/HDPE).

3. Copolymers of monoolefins and diolefins with one another or with other vinyl monomers, e.g. ethylene/propylene copolymers, propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers and ethylene/vinyl acetate copolymers, and terpolymers of ethylene with propylene and a diene such as hexadiene, dicyclopentadiene or ethylidenenorbornene, and also mixtures of such copolymers with one another and with polymers mentioned under 1), e.g., polypropylene with ethylene/propylene copolymers, LDPE with ethylene/vinyl acetate copolymers, LDPE with ethylene/acrylic acid ester copolymers, LLDPE with ethylene/vinyl acetate copolymers and LLDPE with ethylene/acrylic acid ester copolymers.

4. Polystyrene, poly(p-methylstyrene) and poly($\alpha$-methylstyrene).

5. Copolymers of styrene or $\alpha$-methylstyrene with dienes or acrylic derivatives, e.g. styrene/butadiene, styrene/acrylonitrile, styrene/alkyl methacrylate, styrene/butadiene/alkyl acrylate, styrene/maleic anhydride ad styrene/acrylonitrile/methyl acrylate, high impact strength mixtures of styrene copolymers and another polymer, e.g., a polyacrylate, a diene polymer or an ethylene/propylene/diene terpolymer, and block copolymers of styrene, e.g. styrene/butadiene/styrene, styrene/isoprene/styrene, styrene/ethylene-butylene/styrene, styrene/ethylene-propylene/styrene or styrene/4-vinylpyridine/styrene.

6. Graft copolymers of styrene or $\alpha$-methylstyrene, e.g. styrene on polybutadiene, styrene on polybutadiene/styrene or polybutadiene/acrylonitrile copolymers, styrene and acrylonitrile (or methacrylonitrile) on polybutadiene, styrene, acrylonitrile and methyl methacrylate on polybutadiene, styrene and maleic anhydride on polybutadiene, styrene, acrylonitrile and maleic anhydride or maleimide on polybutadiene, styrene and maleimide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 5), e.g. those known as ABS, MBS, ASA or AES polymers.

7. Halogen-containing polymers, e.g., polychloroprene, chlorinated rubber, chlorinated or chlorosulfonated polyethylene, epichlorohydrin homopolymers and copolymers, especially polymers of halogen-containing vinyl compounds, such as polyvinyl chloride, polyvinylidene chloride, polyvinyl fluoride or polyvinylidene fluoride, and copolymers thereof such as vinyl chloride/vinylidene chloride, vinyl chloride/vinyl acetate or vinylidene chloride/vinyl acetate.

8. Polymers derived form derivatives of $\alpha,\beta$-unsaturated acids, such as polyacrylates, polymethacrylates and polyacrylonitriles.

9. Copolymers of the monomers mentioned under 8) with one another or with other unsaturated monomers, e.g., acrylonitrile/butadiene copolymers, acrylonitrile/alkyl acrylate copolymers, acrylonitrile/alkoxyalkyl acrylate copolymers, acrylonitrile/vinyl halide copolymers, acrylonitrile/alkyl methacrylate/butadiene terpolymers or alkyl methacrylate/4-vinylpyridine copolymers.

10. Polymers derived from acyl derivatives or acetals of unsaturated alcohols, such as polyvinyl acetate, stearate, benzoate or maleate, polyvinylbutyral or polyallyl phthalate, and copolymers thereof with olefins mentioned in section 1.

11. Homopolymers and copolymers of cyclic ethers, such as polyalkylene glycols, polyethylene oxide, polypropylene oxide or polybutylene glycol.

12. Polyacetals such as polyoxymethylene and polyoxymethylenes which contains comonomers such as ethylene oxide, and polyacetals modified with thermoplastic polyurethanes, acrylates or MBS.

13. Polyphenylene oxides and sulfides and mixtures thereof with styrene polymers.

14 Polyurethanes derived on the one hand from polyethers, polyesters and polybutadienes containing terminal hydroxyl groups and on the other hand from aliphatic or aromatic polyisocyanates, and precursors thereof.

15. Polyureas, polyimides and polybenzimidazoles. Among the polyimides, soluble polyimides are especially preferred, such as those disclosed e.g., in German Auslegeschrift 1962588 and European patent applications A-132221, A-134752, A-162017, A-181837 and A-182745.

16. Polycarbonates, polyesters, e.g. polyalkylene terephthalates, and polyester-carbonates.

17. Polysulfones, polyether-sulfones and polyetherketones.

18. Polyvinylcarbazole.

19. Polyadducts of unsubstituted or hydroxyalkylated epoxy compounds containing an average of more than one epoxy group per molecule, and diols, primary monoamines, disecondary diamines, disecondary linear or cyclic dicarboxylic acid diamides or dicarboxylic acids.

20. Cellulose derivatives chemically modified in a polymer-homologous manner, such as cellulose acetates, propionates and butyreates, or cellulose ethers such as methyl cellulose.

21. Sulfur-crosslinked (vulcanized) products derived from polymers containing double bonds, e.g. natural rubber, synthetic rubber and butadiene or isoprene polymers or copolymers.

22. Mixtures (polyblends) of the afore-mentioned polymers, e.g. PP/EPDM, PVC/EVA/ PVC/ABS, PVC/MBS, PC/ABS, PC/ASA, PC/PBT, PVC/CPE, PVC/acrylates, POM/thermoplastic PUR, PC/thermoplastic PUR, POM/acrylate POM/MBS and PPO/HIPS.

A preferred group of thermoplastic polymers comprises polyolefins, polystyrene, polyvinyl chloride, polyvinylidene chloride, polyvinylidene fluoride, polyacrylates, polymethacrylates, polycarbonates, aromatic polysulfones, aromatic polyethers, aromatic polyethersulfones and polyimides, as well as polyvinylcarbazole.

The thermoplastic polymers of component a) can have a degree of polymerization of 5 to 10,000, preferably 10 to 5000 and in particular 10 to 1000.

The composition of the invention can also contain thermosetting polymers, e.g. up to 95% by weight and especially up to 80% by weight.

Examples are:

1. Crosslinked unsaturated polyesters of e.g. maleic acid and diols and, if desired, comonomers such as styrene.

2. Crosslinked epoxy resins derived from polyepoxides, e.g. from bisglycidyl ethers or cycloaliphatic diepoxides. They can be thermally crosslinked e.g. with anhydrides or using curing catalyst.

The aliphatic and cycloaliphatic side groups of component a) are substituted by Cl, Br or I, especially in the $\alpha$-, $\beta$- or $\gamma$-position and more especially in the $\alpha$- and/or $\beta$-position. The aliphatic group preferably contains 1 to 4 C atoms which are partially or totally substituted by Cl, Br or I. Substitution by Cl is especially preferred.

The aliphatic side group can be e.g. linear or branched $C_1$–$C_{12}$, especially $C_1$–$C_6$ and more especially $C_1$–$C_4$alkyl. Examples are methyl, ethyl and the isomers of propyl, butyl, pentyl, hexyl, heptyl, octyl, nonyl, decyl, undecyl and dodecyl. Examples of cycloaliphatic groups are, in particular, cyclopentyl and cyclohexyl. Methyl or ethyl monosubstituted or polysubstituted by Cl, Br or I, in particular Cl, are especially preferred, e.g., $-CH_2Cl$, $-CHCl_2-CCl_3$, $-CHClCH_3$, $-CCl_2CH_3-CHCl-CH_2Cl$, $-CCl_2-CH_2Cl$, $-CHCl-CHCl_2$, $-CCl_2-CHCl_2$, $-CCl_2-CCl_3$, $-CH_2-CH_2Cl$, $-CH_2-CHCl_2$ or $-CH_2-CCl_3$.

The groups $-O-$, $-O-CO-$, $-CO-OR^2-$, $-O-CO-$ or $-CO-O-$ preferably have groups of the formula $-C_mH_nX_o^2$ bonded to them, wherein m is a number from 1 to 12, n is 0 or a number from 1 to 24, o is a number from 1 to 25 and $n+o=2m+1$, $X^2$ is Cl, Br or I and $R^{22}$ is $C_2$–$C_{12}$alkylene, $C_4$–$C_{12}$cycloalkylene, $C_4$–$C_{12}$cycloalkylene-$CH_2-$, $C_2$–$C_{12}$cycloalkylene-$(CH_2)_2$, benzylene or xylylene which is unsubstituted or substituted by OH, Cl, Br or phenyl. $X^2$ is preferably Cl, m is preferably 1 to 6, especially 1 to 4, n is preferably 0 or 1 to 12, especially 1 to 8, o is preferably 1 to 13, especially 1 to 9, and $n+o=2m+1$.

The thermoplastic polymers can be based on different polymers containing hydroxyl groups or carboxyl groups, or mixtures of said polymers, e.g. polyesters, polyester-amides, polyurethanes, polyamides, polycarbonates and polyimides derived from monomers containing hydroxyl groups, saponified and unsubstituted or hydroxyalkylated polymers of vinyl esters or ethers, hydroxylated polydiolefins such as polybutadiene or polyisoprene, polyacrylates or polymethacrylates containing hydroxylalkyl radical in the ester group, polyacrylic or polymethacrylic acids, or reduced polyketones or copolymers thereof, as well as copolymers of unsubstituted or hydroxyalkylated vinyl alcohol, acrylates or methacrylates, acrylic acids or methacrylic acids or diolefins with comonomers such as acrylonitrile, olefins, diolefins, vinyl chloride, vinylidene chloride, vinyl fluoride, vinylidene fluoride, styrene $\alpha$-methylstyrene, maleic anhydride, maleimide, vinyl ethers and vinyl esters, and polyadducts of unsubstituted or hydroxyalkylated epoxy compounds containing an average of more than one epoxy group per molecule, and diols, primary monoamines, disecondary diamines, disecondary linear or cyclic dicarboxylic acid diamides or dicarboxylic acids.

In a preferred embodiment, the thermoplastic polymer of component a) is a linear polyadduct of a glycidyl compound containing an average of more than one epoxy group, and a diol, a primary monoamine, a disecondary diamine, a disecondary linear or cyclic dicarboxylic acid diamide or a dicarboxylic acid, in which polyadduct the H atom of the secondary OH groups is at least partially substituted by a group $-CO-C_mH_nS_o^2$, wherein m is a number from 1 to 12, n is 0 is a number from 1 to 24, o is a number from 1 to 25 and $n+o=2m=1$, and $X^2$ is Cl, Br or I. The polyadducts are preferably based on glycidyl compounds containing an average of two epoxy groups per molecule.

Especially suitable glycidyl compounds are those containing two glycidyl groups, $\beta$-methylglycidyl groups or 2,3-epoxycyclopentyl groups bonded to a heteroatom (e.g. sulfur or, preferably, oxygen or nitrogen), especially bis(2,3-epxocycyclopentyl) ether; diglycidyl ethers of polyhydric aliphatic alcohols such as butane-1,4-diol, or of polyalkylene glycols such as polypropylene glycol; diglycidyl ethers of cycloaliphatic polyols such as 2,2-bis(4-hydroxycyclohexyl)propane; diglycidyl ethers of polyhydric phenols such as resorcinol, bis(p-hydroxyphenyl)methane, 2,2-bis(p-hydroxyphenyl)propane (=diomethane), 2,2-bis(4'-hydroxy-3',5'-dibromophenyl)propane and 1,3-di(p-hydroxyphenyl)ethane; di($\beta$-methylglycidyl) ethers of the dihydric alcohols or dihydric phenols listed above; diglycidyl esters of dicarboxylic acids such as phthalic acid, terephthalic acid, $\Delta^4$-tetrahydrophthalic acid and hexahydrophthalic acid; N,N-diglycidyl derivatives of primary amines and amides and heterocyclic nitrogen bases containing two N atoms, and N,N'-diglycidyl derivatives of disecondary diamides and diamines, such as N,N-diglycidylaniline, N,N-diglycidyltoluidine, N,N-diglycidyl-p-aminophenyl methyl ether and N,N'-dimethyl-N,N'-diglycidyl-bis(p-aminophenyl)methane;

N',N"-diglycidyl-N-phenyl isocyanurate; N,N'-diglycidylethyleneurea; N,NH'-diglycidyl-5,5-dimethylhydantoin, N,N'-diglycidyl-5-isopropylhydantoin, N,N-methylenebis(N', N'-diglycidyl-5,5-dimethylhydantoin) and 1,3-bis(N-glycidyl-5,5-dimethylhydantoin)-2-hydroxypropane; and N,N'-diglycidyl-5,5-dimethyl-6-isopropyl-5,6-dihydrouracil.

The glycidyl compounds can be reacted with aliphatic, cycloaliphatic or aromatic diols to give the preferred polyadducts, a secondary alcohol group, which can be esterified with carboxylic acids containing Cl, Br and/or I, being formed by addition on to the glycidyl group.

However, the glycidyl compounds can also be reacted with the following compounds to give linear polyadducts by polyaddition: primary aliphatic, cycloaliphatic or aromatic monoamines (e.g. aniline, toluidine, $C_1$-$C_{12}$alkylamines, $C_2$-$C_{12}$hydroxyalkylamines), aliphatic, cycloaliphatic or aromatic dicarboxylic acids (e.g. maleic acid, adipic acid, trimethyladipic acid, sebasic acid, azelaic acid, succinic acid, dodecylsuccinic acid, phthalic acid, terephthalic acid, $\Delta^4$-tetrahydrophthalic acid, hexahydrophthalic acid, $\Delta^4$-methylhexahydrophthalic acid, 3,6-endomethylene-$\Delta^4$-tetrahydrophthalic acid, 4-methyl-3,6-endomethylene-$\Delta^4$-tetrahydrophthalic acid) or aliphatic, cycloaliphatic, heterocyclic or aromatic bis-secondary amines or bis-secondary carboxamides (e.g. N,N'-dimethylethylenediamine, N,N'-dimethylpropylene-1,3-diamine, N,N'-dimethylhexamethylendiamine, N,N'-dicyclohexylhexamethylenediamine, N,N',N"-trimethyldiethylenetriamine, N,N'-diethylpropylene-1,3-diamine, N-methyl-3,5,5-trimethyl-3-(methylaminomethyl)cyclohexylamine, N,N'-dimethylated or N,N'-diethylated aromatic diamines, e.g., m- or p-phenylenediamine, bis(4-aminophenyl)methane or bis(4-aminophehyl) sulfone, 2,2-bis(4-aminophenyl)propane, N,N-dimethyl-m-xylenediamine, as well as ethyleneurea, 5,5-dimethylhydantoin, 5-isopropylhydantoin, N,N-methylene-bis-5,5-dimethylhydantoin, 1,3-bis(5,5-dimethylhydantoin)-2-hydroxypropane, 5,5-dimethyl-6-isopropyl-5,6-dihydrouracil).

It is preferred to use a compound of the invention in which the polyadduct contains a) 100 to 0.1 mol % of identical or different structural units of formula V

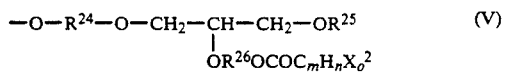

and b) 99.9 to 0 mol% of identical or different structural units of formula VI

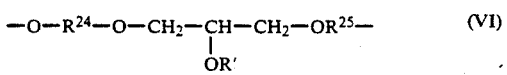

based on the polyadduct, wherein $R^{24}$ and $R^{25}$ are independently of the other the radical of a diol containing aliphatic or aromatic diol groups, from which two hydroxyl groups have been removed, R' is H, unsubstituted or OH-substituted $C_1$-$C_{20}$alkyl, $C_1$-$C_{20}$acyl or aminocarbonyl N-substituted by a $C_1$-$C_{20}$hydrocarbon radical, —$OR^{26}$— is a direct bond or $R^{26}$ is ethylene which is unsubstituted or substituted by $C_1$-$C_{16}$alkyl.

The composition preferably contains 100 to 20 and especially 30 to 100 mol % of structural units of formula V and 80 to 0 and especially 70 to 0 mol % of structural units of formula VI.

In a preferred embodiment, $R^{24}$ and $R^{25}$ are identical radicals. $R^{24}$ and $R^{25}$ as radicals having aliphatic diol groups preferably contains 2 to 12 and especially 2 to 8 C atoms. The hydroxyl groups can be bonded to open-chain or cyclic aliphatic radicals. Examples of typical aliphatic radicals are linear or branched $C_2$-$C_{12}$alkylene, $C_3$-$C_8$cycloalkylene, $C_1$-$C_4$alkyl-$C_5$-$C_8$cycloalkyl, cyclohexylmethylene or cyclohexyldimethylene. Examples are ethylene, 1,2- or 1,3-propylene, 1,2-, 1,3-, 1,4-, 1,5- or 1,6-hexylene, heptylene, oxtylene, nonylene, decylene, undecylene dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are especially phenolic groups. The diol radicals having phenolic groups preferably contains 6–30 and especially $6 \geqq 20$ C atoms. A preferred embodiment consists of compositions in which $R^{24}$ and $R^{25}$ are independent of the other a radical of the formula

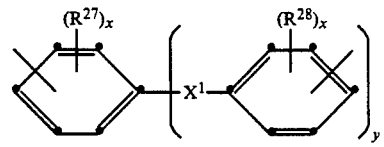

wherein $X^1$ is a direct bond, $C_1$-$C_4$-alkylene, $C_2$-$C_{12}$alkylidene, $C_5$-$C_8$cycloalkylidene, —O—, —S—, —SO—, —$SO_2$—, —CO—, —$CO_2$—, —$N(C_1$-$C_4$alkyl)— or —$Si(CH_3)_2$—, $R^{27}$ and $R^{28}$ are independently of the other H, halogen, $C_1$-$C_4$alkyl or $C_1$-$C_4$alkoxy, x is 0, 1 or 2 and y is 0 or 1. $X^1$ is preferably a direct bond, methylene, ethylene, $C_2$-$C_6$alkylidene, cyclohexylidene, cyclopentylidene, —O— or —SX—. $R^{27}$ and $R^{28}$ are preferably H or methyl and y is preferably 1.

$R^{24}$ and $R^{25}$ are especially the radical

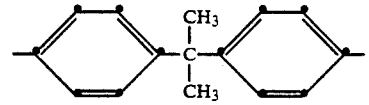

$R^{26}$ is alkyl-substituted ethylene preferably contains $C_1$-$C_4$alkyl and especially $C_1$ or $C_2$alkyl. Ethylene, 1,2-propylene and 1,2- or 2,3-butylene are especially preferred.

R' as $C_1$-$C_{20}$ alkyl can be linear or branched. R' as acyl can be e.g. $C_1$-$C_{20}$alkyl—CO—, $C_5$-$C_8$cycloalkyl—CO—, $C_1$-$C_{15}$alkyl-$C_5$-$C_8$cycloalkyl—CO—, $C_5$-$C_8$cyucloalkyl—$CH_2$—CO—, $C_1$-$C_{14}$alkyl-$C_5$-$C_8$-cycloalkyl—$CH_2$—CO—, phenyl—CO—, benzyl—CO—, $C_1$-$C_{14}$alkyl-phenyl—CO— or $C_1$-alkyl-benzyl—CO—. The hydrocarbon radical in the aminocarbonyl can be e.g. $C_1$-$C_{20}$alkyl-, $C_5$-$C_8$cycloalkyl-, $C_1$-$C_{15}$alkyl-$C_5$-$C_8$cycloalkyl-, $C_5$-$C_8$cycloalkyl-$CH_2$—, $C_1$-$C_{14}$alkyl-$C_5$-$C_8$cycloalkyl—$CH_2$—, phenyl-, benzyl-, $C_1$-$C_{14}$alkyl-phenyl- or $C_1$-$C_{14}$alkyl-benzyl-. R' is preferably H.

In another preferred embodiment, the thermoplastic polymer of component a) is a homopolymer or copolymer of an acrylic acid or methacrylic acid ester containing chlorinated, brominated and/or iodinated aliphatic or cycloaliphatic groups in the ester group.

In an especially preferred embodiment, the polymer contains a) 0.1 to 100 mol % of at least one structural unit of formula III

and b) 0 to 99.9 mol % of at least one structural unit of formula IV

based on the polymer wherein $R^{17}$ is H or methyl; $R^{18}$ is a radical $-(-R^{22}-)-O-CO-{}_zC_mH_nS_o{}^2$, wherein z is 0 or 1, m is a number from 1 to 12, n is 0 or a number from 1 to 24, o is a number from 1 to 25 and $n+o=2m+1$, $X^2$ is Cl, Br or I and $R^{22}$ is $C_2$-$C_{12}$alkylene, $C_4$-$C_{12}$cycloalkylene, $C_4$-$C_{12}$cycloalkylene—$CH_2$—, $C_2$-$C_{12}$cycloalkylene-$(-CH_2-)_2$, benzylene or xylylene which is unsubstituted or substituted by OH, Cl, Br or phenyl; $R^{19}$ is H, $C_1$-$C_6$alkyl or —$COOR^{23}$; $R^{20}$ is H, F, Cl, CN or $C_1$-$C_6$-alkyl; and $R^{21}$ is H, F, Cl, Cn, $R^{23}$—O—, $C_1$-$C_{12}$alkyl, —$COOR^{23}$, —$COOR^{22}$—OH,

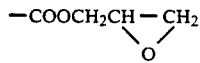

or phenyl, wherein $R^{22}$ is as defined above and $R^{23}$ is $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)phenyl, benzyl or ($C_1$-$C_{12}$alkyl)benzyl.

The polymer preferably contains 100 to 20 and especially 100 to 30 mol % of structural units of formula III and 80 to 0 and especially 70 to 0 mol % of structural units of formula IV.

$R^{17}$ is preferably methyl. $X^2$, m, n and o have the preferred meanings given above and z is preferably 1.

$R^{22}$ is preferably unsubstituted or substituted by OH or Cl. $R^{22}$ as alkylene preferably contains 2 to 6 C atoms. The alkylene can be linear or branched. Examples are ethylene and the isomers of propylene, butylene, pentylene, hexylene, heptylene, octylene, nonylene, decylene, undecylene and dodecylene. $R^{22}$ as cycloalklene is especially cyclohexylene and, in the radicals containing cycloalkylene, is preferably cyclohexylene.

$R^{23}$ can be linear or branched $C_1$-$C_{18}$, preferably $C_1$-$C_{12}$ and especially $C_1$-$C_6$alkyl. $R^{23}$ as cycloalkyl is especially cyclopentyl or cyclohexyl. When $R^{23}$ is ($C_1$-$C_{12}$alkyl)cycloalkyl, the cycloalkyl is especially cyclopentyl or cyclohexyl and the alkyl group can be linear or branched and preferably contains 1 to 6 and especially 1 to 4 C atoms. When $R^{23}$ is alkylphenyl or alkylbenzyl, the alkyl group can be linear or branched and preferably contains 1 to 6 and especially 1 to 4 C atoms.

$R^{19}$ is preferably H. $R^{19}$ as alkyl is preferably methyl or ethyl. When $R^{19}$ is —$COOR^{23}$, $R^{23}$ is preferably $C_1$-$C_{12}$ and especially $C_1$-$C_6$alkyl.

$R^{20}$ is alkyl is preferably $C_1$-$C_4$alkyl, e.g. methyl, ethyl, n-propyl or n-butyl. $R^{20}$ is preferably H, Cl or $C_1$-$C_4$alkyl.

When $R^{21}$ is the group $R^{23}$—O—, $R^{23}$ is preferably $C_1$-$C_{12}$ and especially $C_1$-$C_6$alkyl. $R^{21}$ as alkyl preferably contains 1 to 6 and especially 1 to 4 C atoms. When $R^{21}$ is the group —$COOR^{23}$, $R^{23}$ is preferably $C_1$-$C_{12}$ and especially $C_1$-$C_6$alkyl, cyclopentyl or cyclohexyl. When $R^{21}$ is the group —$OCO$—$R^{23}$, $R^{23}$ is preferably $C_1$-$C_{12}$ and especially $C_1$-$C_6$alkyl, phenyl or benzyl.

When $R^{21}$ is the group —$COOR^{22}OH$, $R^{22}$ has the preferred meanings given above.

In a preferred embodiment, $R^{19}$ is H, $R^{20}$ is H, F, Cl, methyl or ethyl and $R^{21}$ is F, Cl, Cn, $C_1$-$C_4$alkyl, $C_1$-$C_6$alkoxy, —$COO$—$C_1$-$C_6$alkyl, —$COO$-$R^{22}$—OH, —$OOC$—$C_1$-$C_6$alkyl or phenyl.

In a preferred composition, $R^{17}$ is methyl; $R^{18}$ is a radical —$R^{22}$—O—CO—$C_mH_nX_o{}^2$, wherein m is a number from 1 to 6, n is 0 or a number from 1 to 12, o is a number from 1 to 13 and $n+o=2m+1$, $X^2$ is Cl and $R^{22}$ is $C_2$-$C_6$alkylene, cyclopentylene, cyclohexylene, cyclopentylene—$CH_2$—, cyclohexylene—$CH_2$— or cyclohexylene-$(-CH_2-)_2$ which is unsubstituted or substituted by OH or Cl; $R^{19}$ is H; $R^{20}$ is H, F, Cl or $C_1$-$C_4$alkyl; and $R^{21}$ is H, F, Cl, Cn, $R^{23}$—O—, $C_1$-$C_6$alkyl, —$COOR^{23}$, —O—CO—$R^{23}$, —$COOR^{22}$—OH,

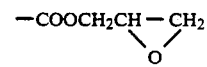

or phenyl, $R^{22}$ being as defined above and $R^{23}$ being $C_1$-$C_6$alkyl, $C_5$ or $C_6$cycloalkyl, phenyl or benzyl.

In another preferred composition, $R^{17}$ is methyl; $R^{18}$ is a radical —$R^{22}$—O—CO—$C_mH_nX_o{}^2$, wherein m is a number from 1 to 4, n is 0 or a number from 1 to 8, o is a number from 1 to 9 and $n+o=2m+1$, $X^2$ is Cl and $R^{22}$ is linear $C_2$-$C_6$alkylene or —$CH_2CHOHCH_2$—; $R^{19}$ and $R^{20}$ are H; and $R^{21}$ is —$COOR^{22}OH$ or —$COOR^{23}$, wherein $R^{22}$ is as defined above and $R^{23}$ is $C_1$-$C_6$alkyl.

Especially preferred compositions are those in which, in formula III, $R^{17}$ is H or $CH_3$ and $R^{22}$ is linear or branched $C_2$-$C_6$alkylene, cyclopentylene or cyclohexylene, and in formula IV, $R^{19}$ is H, $R^{20}$ is H or methyl and $R^{21}$ is —$COOR^{23}$ or —$COOR^{22}OH$, $R^{22}$ and $R^{23}$ being as defined above, including the preferred meanings.

In another preferred embodiment, the thermoplastic polymer of component a) is a homopolymer or copolymer of vinyl alcohol in which the H atoms of the secondary OH group is at least partially substituted by a group —Y—$C_mH_nS_o{}^2$, wherein Y is a direct bond, —CO— or —$R^{26}$—O—CO—, $X^2$ is Cl, Br or I, m is a number from 1 to 12, n is 0 or a number from 1 to 24, o is a number from 1 to 25 and $n+o=2m+1$, $R^{26}$ being ethylene which is unsubstituted or substituted by $C_1$-$C_{16}$alkyl.

The compositions preferably contain copolymers.

Preferred compositions are those in which the copolymer contains a) 90 to 0.1 mol % of structural units of formula VII

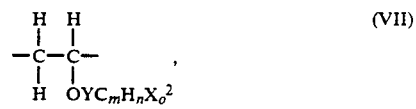

and b) 99.9 to 10 mol % of identical or different structural units of formula VIII

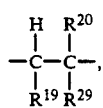  (VIII)

wherein Y is a direct bond, —CO— or —R²-6—O—CO—, R²⁶ being ethylene which is unsubstituted or substituted by $C_1$-$C_{16}$alkyl; $X^2$ is Cl, Br or I; m is a number from 1 to 12, n is 0 or a number from 1 to 24, o is a number from 1 to 25 and $n+o=2m+1$; $R^{19}$ is H, $C_1$-$C_6$alkyl or —COOR²³; $R^{20}$ is H, F, Cl, CN or $C_1$-$C_6$alkyl; and $R^{29}$ is H, F, Cl, CN, OH, $R^{23}O$—, $C_1$-$C_{12}$alkyl, —COOR²³, —O—CO—R²³, —OR²²OH or phenyl, R²³ being $C_1$-$C_{18}$alkyl, $C_5$-$C_7$cycloalky, ($C_1$-$C_{12}$alkyl)-$C_5$-$C_7$cycloalkyl, phenyl, ($C_1$-$C_{12}$alkyl)-phenyl, benzyl or ($C_1$-$C_{12}$alkyl)benzyl and R²² being ethylene which is unsubstituted or substituted by $C_1$-$C_{16}$ alkyl.

The compositions preferably contain 70 to 10 and especially 60 to 20 mol % of structural units of formula VII and 30 to 90 and especially 40 to 80 mol % of structural units of formula VIII.

$R^{19}$ and $R^{20}$ in formula VIII have the preferred meanings given above. $R^{22}$ and $R^{23}$ also have the preferred meanings given above.

$R^{29}$ is preferably H, F, Cl, CN, OH, $R^{23}$—O—, $C_1$-$C_4$alkyl, —COOR²³, —O—CO—R²³, phenyl, —OCH₂CH₂OH or —OCH₂CH(CH₃)OH, R²³ being $C_1$-$C_6$alkyl.

Especially preferred compositions are those in which $R^{19}$ and $R^{20}$ are H and $R^{29}$ is —OCOR²³, wherein R²³ is $C_1$-$C_{18}$alkyl, $C_5$-$C_7$cycloalkyl, ($C_1$-$C_{12}$alkyl)-$C_5$-$C_7$cycloalkyl, phenyl, benzyl, ($C_1$-$C_{12}$alkyl)phenyl or ($C_1$-$C_{12}$alkyl)benzyl.

In a preferred embodiment, Y is a direct bond, —CO—, —CH₂CH₂O—CO— or —CH₂CH(CH₃)O—CO—; $X^2$ is Cl; m is a number from 1 to 6, n is 0 or a number from 1 to 12, o is a number from 1 to 13 $n+o=2m+1$; $R^{19}$ and $R^{20}$ are H; and $R^{29}$ is H, F, Cl, CN, OH, $R^{23}O$—, $C_1$-$C_4$alkyl, —COOR²³, —O—CO—R²³, phenyl, —OCH₂CH₂OH or —OCH₂CH₂OH or —OCH₂CH(CH₃)OH, R²³ being $C_1$-$C_6$alkyl, $C_5$ or $C_6$cycloalkyl, phenyl or benzyl.

The invention further relates to a composition comprising a) a thermoplastic polymer which contains aliphatic or cycloaliphatic side groups bonded to a polymer backbone via a group —O—, —O—CO—, —CO—OR²²—OCO— or —CO—O—, said side groups containing at least one Cl, Br or I atoms in the α-, β-, γ- or ω-position, R²² being $C_2$-$C_{12}$alkylene, $C_4$-$C_{12}$cycloalkylene, $C_4$-$C_{12}$cycloalkylene—CH₂—, $C_4$-$C_{12}$cycloalkylene-(CH₂)z, benzylene or xylylene which is unsubstituted or substituted by OH, Cl, Br or phenyl, and b) a compound of formula I and/or formula Ia

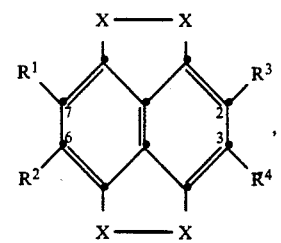

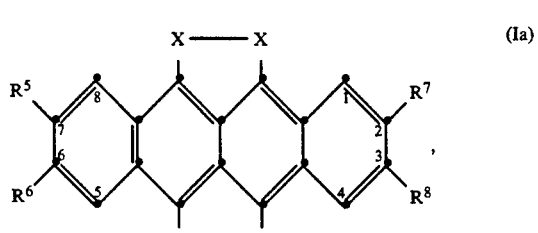

wherein X is S, Se or Te, $R^1$, $R^2$, $R^3$ and $R^4$ are independently of the others a hydrogen atom or Cl, or $R^1$ and $R^2$, and $R^3$ and $R^4$, together are each

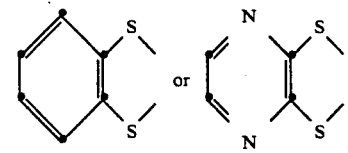

or $R^1$, $R^2$, $R^3$ and $R^4$ are each phenylthio, 4-methylphenylthio, 4-methoxyphenylthio or pyrid-4-ylthio, and $R^5$, $R^6$, $R^7$ and $R^8$ are independently of the others H or F, or $R^5$ is CH₃ and $R^6$, $R^7$ and $R^8$ are H, or $R^5$, $R^6$, $R^7$ and $R^8$ are CH₃, or $R^5$ and $R^6$ are CH₃ or Cl and $R^7$ and $R^8$ are H, or $R^5$ and $R^6$ are CH₃, or $R^5$ and $R^6$ are CH₃ or Cl and $R^7$ and $R^8$ are H, or $R^5$ and $R^6$ are H, $R^7$ is —COR⁹ and $R^8$ is H or 'COR⁹, or $R^5$ and $R^6$ are H and $R^7$ and $R^8$ together are —CO—O—CO— or —CO—NR¹—CO—, wherein $R^9$ is halogen, —OH, —NH₂, the radical of an alcohol or of a primary or secondary amine, or —OM, M being a cation, and R10 is H or the radical of a primary amine from which the NH₂ group has been removed, and c) if desired, an inert organic solvent.

The composition of the invention can additionally contain a solvent for a soluble polymer and component b). Example of suitable solvents are polar aprotic solvents, which can be used by themselves or in mixtures of at least two solvents. Examples are: ethers such as dibutyl ether, tetrahydrofuran and dioxane, methylene glycol, dimethylethylene glycol, dimethyldiethylene glycol, diethyldiethylene glycol and dimethyltriethylene glycol, halogenated hydrocarbons such as methylene chloride, chloroform, 1,2-dichloroethane, 1,1,1-trichloroethane and 1,1,2,2-tetrachloroethane, carboxylic acid esters and lactone such as ethyl acetate, methyl propionate, ethyl benzoate, 2-methoxyethyl acetate, γ-butyrolactone, δ-valerolactone and pivalolactone, carboxamides and lactams such as N-methylformamide, N,N-dimethylformamide, N,N-diethylformamide, N,N-dimethylacetamide, N,N-diethylacetamide, γ-butyrolactam, ε-caprolactam, N-methylpyrrolidone, N-acetylpyrrolidone, N-methylcaprolactam tetramethylurea and hexamethylphosphoric acid triamide, sulfoxides such as dimethyl sulfoxide, sulfones such as dimethyl sulfone, diethyl sulfone, trimethylene sulfone and tetramethylene sulfone, N-methylpyrrolidine, N-methylpiperidine, N-methylmorpholine, and substituted benzenes such as benzonitrile, chlorobenzene, o-dichlorobenzene, 1,2,4-trichlorobenzene, nitrobenzene, toluene and xylene.

The composition of the invention can additionally contain auxiliaries required for processing and use, e.g. plasticizers, flow control agents, mould release agents, fillers, flameproofing agents, antioxidants and light stabilizers, other stabilizers, dyes and pigments.

Most preferably, the composition of the invention additionally contains a thermoplastic polymer differing from component a). Examples of additional polymers have been described previously. The addition of these polymers makes it possible to avoid too high a proportion of the halogenated polymer of component a). The proportion of the thermoplastic polymer can be e.g. up to 95% by weight and preferably up to 80% by weight, based on the halogenated polymer of component a).

The halogenated polymer of component a) is conveniently present at least in a sufficient amount to form CT complexes of the compounds of component b). The amount to be used depends essentially on the degree of halogenation of the side groups of polymer a) and on the proportion of such side groups in polymer a). The amount can be chosen so that 0.5 to 2 and especially 1 to 2 mol of halogen (Cl, Br, I) are present in the side groups of the polymer of the component a), per mol of compound of formula I or Ia. It is advantageous to use and excess of polymer a).

Component b) is preferably present in an amount of 0.01 to 20% by weight, especially 0.05 to 10% by weight and more especially 0.1 to 5% by weight, based on the polymer of component a).

In other respects, the preferences indicated above apply to this compound of the invention.

This compound of the invention is prepared simply by mixing the components, a solvent being used as well if desired. The mixing process can also be combined with a shaping process using known methods, e.g., casting. injection moulding, calendering or extrusion.

The invention further relates to a process for the preparation of the compositions of the invention containing CT complexes, which comprises allowing a) a thermoplastic polymer which contains aliphatic or cycloaliphatic side groups bonded to a polymer backbone via a group —O—, —O—CO—, —CO—OR$^{22}$—OCO— or —CO—O—, said side groups containing at least one Cl, Br or I atoms in the $\alpha$-, $\beta$-, $\gamma$- or $\omega$-position, to act on b) a compound of formula I and/or formula Ia

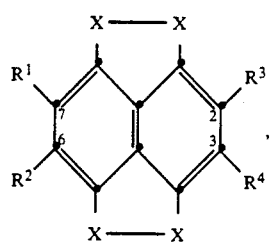

(I)

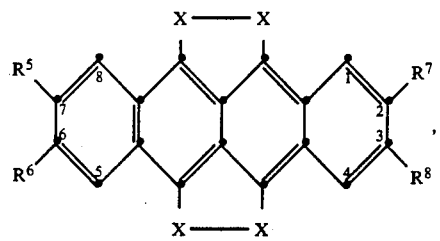

wherein X is S, Se or Te, $R^1$, $R^2$, $R^3$ and $R^4$ are independently of the others a hydrogen atom or Cl, or $R^1$ and $R^2$, $R^3$ and $R^4$, together are each

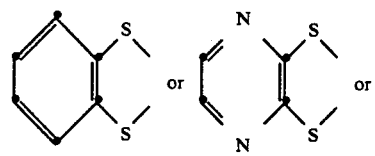

$R^1$, $R^2$, $R^3$ and $R^4$ are each phenylthio, 4-methylphenylthio, 4-methoxyphenylthio or pyrid-4-ylthio, and $R^5$, $R^6$, $R^7$ and $R^8$ are independently of the others H or F, or $R^5$ is $CH_3$ and $R^6$, $R^7$ and $R^8$ are H, or $R^5$, $R^6$, $R^7$ and $R^8$ are $CH_3$, or $R^5$ and $R^6$ are $CH_3$ or Cl and $R^7$ and $R^8$ are H, or $R^5$ and $R^6$ are H, $R^7$ is —COR$^9$ and $R^8$ is H or —COR$^9$, or $R^5$ and $R^6$ are H and $R^7$ and $R^8$ together are —CO—O—CO— or —CO—NR$^1$—CO—, wherein $R^9$ is halogen, —OH, —NH$_2$, the radical of an alcohol or of a primary or secondary amine or —OM, M being a cation, and $R^{10}$ is H or the radical of a primary amine from which the NH$_2$ group has been removed.

The process is advantageously carried out with an input of energy. The energy can be e.g. thermal energy or radiation energy. In the case of radiation energy, irradiation can be carried out e.g. imagewise through a mask or by means of imagewise control of a light beam, or over the whole surface. Thermal energy means, for example, an elevated temperature such as a temperature of 25° to 350° C., especially 50° to 200° C. Simultaneous thermal curing is possible when thermoset-forming constituents are also used.

In one preferred embodiment, the process is carried out in the presence of an inert organic solvent which evaporates at elevated temperature.

In another preferred embodiment, component a) is used in a greater amount than is necessary to form the CT complex.

The halogen-containing polymer a) can be mixed e.g. with a compound of formula I and/or Ia and, if desired, with solvents and additional polymers. The mixing process can be combined with a simultaneous shaping process, e.g. casting, injection moulding, extrusion or calendering. The temperature required to form CT complexes can be reached e.g. during the shaping process. However, heat can also be applied after the shaping process. When solvents are also used, they are advantageously removed by heating.

The invention further relates to electrically conducting or antistatic compositions obtainable by the process of the invention.

The compositions of the invention containing a CT complex produce valuable semifinished products or shaped articles, or mouldings, e.g. sheets, films, filaments, fibres, composites or coatings, which are antistatic or electrically conducting.

The invention further relates to the use of the composition of the invention, containing a compound of formula I or Ia, for the production of a) antistatic and/or b) electrically conducting mouldings sheets, filaments, fibres, coatings or composites.

The invention further relates to shaped articles, films, coatings and composites produced from a composition of the invention containing a CT complex.

A preferred field of application is the production of coatings or sheets e.g. by extrusion or by casting or coating. They can be used for the electrostatic shielding of components. The sheets are flexible electrical conductors from which electrodes can be produced, e.g. for display elements. Transparent embodiments are also possible, depending on the polymer or polymer mixture used.

The compositions of the invention containing a CT complex are distinguished by a high chemical stability and heat stability and a low migration of the CT complexes. Furthermore, surprisingly high conductivities are achieved, which can be as much as 25% of the conductivity of the pure CT complexes. The CT complexes form a network of electrically conducting crystal needles in the polymer matrix. The high stability is such that there is little or no loss of electrical conductivity in use.

The thermoplastic polymers of component a) can be prepared in a manner known per se by esterifying a polymer containing carboxyl groups, or its ester-forming derivatives (e.g. polymethacrylic acid or esters thereof), with a Cl-, Br- and/or I-substituted alcohol, or etherifying a polymer containing hydroxyl groups (e.g. polyadducts of compounds containing 2 epoxy groups or hydroxyalkylated derivatives thereof, polyhydroxyalkyl methacrylates, polyvinyl alcohols or hydroxyalkylated derivatives thereof) with a Cl-, Br- or I-substituted alcohol, or esterifying it with a Cl-, Br- or I-substituted carboxylic acid or its ester-forming derivatives, e.g. esters or acid halides. The reaction is conveniently carried out in a solvent and in the temperature range from $-20°$ C. to $100°$ C. The desired polymer can be isolated e.g. by evaporating off the volatile constituents, if necessary under vacuum, or precipitating the polymer from the reaction solution with water and drying it. In this case, however, halogenated carboxylic acid radicals can be partially cleaved by hydrolysis.

The invention further relates to a homopolymer or copolymer of acrylic acid or methacrylic acid esters which contains aliphatic or cycloaliphatic groups in the ester group, said aliphatic or cycloaliphatic groups being chlorinated, brominated and/or iodinated in the $\alpha$-, $\beta$-, $\gamma$- or $\omega$-position.

Preferred homopolymers and copolymers are those in which the ester group contains groups $-(R^{22}-O-CO)_zC_mH_nX_o^2$ bonded to the O atoms of the carboxyl group, wherein z is 0 or 1, m is a number from 1 to 12, n is 0 or a number from 1 to 24, o is a number from 1 to 25 and $n+o=2m+1$, $X^2$ is Cl, Br or I and $R^{22}$ is $C_2$-$C_{12}$alkylene, $C_4$-$C_{12}$cycloalkylene, $C_4$-$C_{12}$cycloalkylene—$CH_2$—, $C_2$-$C_{12}$cycloalkylene—$CH_2$—$_2$, benzylene or xylylene which is unsubstituted or substituted by OH, Cl, Br or phenyl.

In a preferred embodiment, the homopolymer or copolymer contains a) 0.1 to 100 mol % of at least one structural unit of formula III

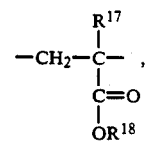

and b) 0 to 99.9 mol % of at least one structural unit of formula IV

based on the polymer wherein $R^{17}$ is H, or methyl; $R^{18}$ is a radical $-(R^{22}-O-CO)_zC_mH_nS_o^2$, wherein z is 0 or 1, m is a number from 1 to 12, n is 0 or a number from 1 to 24, o is a number form 1 to 25 and $n+o=2m+1$, $X^2$ is Cl, Br or I and $R^{22}$ is $C_2$-$C_{12}$alkylene, $C_4$-$C_{12}$cycloalkylene, $C_4$-$C_{12}$cycloalklene—$CH_2$—, $C_2$-$C_{12}$cycloalkylene—$(CH_2)_2$, benzylene or xylylene which is unsubstituted or substituted by OH, Cl, Br or phenyl; $R^{19}$ is H, $C_1$-$C_6$alkyl or —$COOR^{23}$; $R^{20}$ is H, F, Cl, CN or $C_1$-$C_6$alkyl; and $R^{21}$ is H, F, Cl, CN, $R^{23}$—O—, $C_1$-$C_{12}$alkyl, —$COOR^{23}$, —O—CO—$R^{23}$, —$COOR^{22}$—OH,

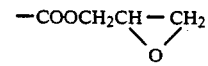

or phenyl, $R^{22}$ being as defined above and $R^{23}$ being $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)phenyl, benzyl or ($C_1$-$C_{12}$alkyl)benzyl.

In an especially preferred embodiment, $R^{17}$ is methyl; $R^{18}$ is a radical —$R^{22}$—O—CO—$C_mH_nS_o^2$, wherein m is a number from 1 to 6, n is 0 or a number from 1 to 12, o is a number from 1 to 13 and $n+o=2m+1$, $X^2$ is Cl and $R^{22}$ is $C_2$-$C_6$alkylene, cyclopentylene, cyclohexylene, cyclopentylene—$CH_2$—, cyclohexylene—$CH_2$— or cyclohexylene—$(CH_2)_2$ which is unsubstituted or substituted by OH or Cl; $R^{19}$ is H; $R^{20}$ is H, F, Cl or $C_1$-$C_4$alkyl; and $R^{21}$ is H, F, CL, Cn, $R^{23}$—O—, $C_1$-$C_6$alkyl, —$COOR^{23}$, —O—CO—$R^{23}$, —$COOR^{22}$—OH,

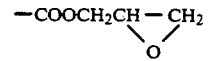

or phenyl, $R^{22}$ being as defined above and $R^{23}$ being $C_1$-$C_6$alkyl, $C_5$ or $C_6$cycloalkyl, phenyl or benzyl. $R^{18}$ is in particular a radical —$R^{22}$—O—CO—$C_mH_nS_o^2$, wherein $R^{22}$ is linear or branched $C_2$-$C_6$alkylene, $X^2$ is Cl, m is a number from 1 to 4, n is 0 or a number from 1 to 8, o is a number from 1 to 9 and $n+o=2m+1$.

The group —$C_mH_nX_o^2$ is in particular —$CH_2Cl$, —$CHCl_2$, —$CCl_3$, —$CHClCH_3$, —$CCl_2CH_3$, —$CHCl$—$CH_2Cl$, —$CCl_2$—$C_2Cl$, —$CHCl$—$CHCl_2$, —$CCl_2$—$CHCl_2$, —$CCl_2$—$CCl_3$, —$CH_2$—$CH_2Cl$, —$CH_2$—$CHCl_2$ or —$CH_2$—$CCl_3$.

The invention further relates to a homopolymer or copolymer which is a linear polyadduct of a glycidyl compound containing an average of more than one epoxy group, and a diol, a primary monoamine, a disecondary diamine, a disecondary linear or cyclic dicarboxylic acid diamide or a dicarboxylic acid, in which polyadduct the H atom of the secondary OH groups is at least partially substituted by a group —CO—$C_mH_nX_o^2$, wherein m is a number from 1 to 12, n is 0 or a number from 1 to 24 o is a number from 1 to 25 and n+o=2m+1, and $X^2$ is Cl, Br or I.

In a preferred embodiment, the polyadduct contains
a) 100 to 0.1 mol % of identical or different structural units of formula V

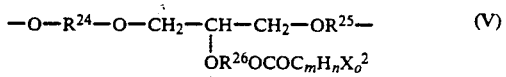

and b) 99.9 to 0 mol % of identical or different structural units of formula VI

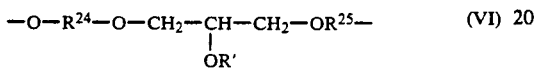

based on the polyadduct, wherein $R^{24}$ and $R^{25}$ are independently of the other the radical of a diol containing aliphatic or aromatic diol groups, from which two hydroxyl groups have been removed, R' is H, unsubstituted or OH-substituted $C_1$-$C_{20}$alkyl, $C_1$-$C_{20}$acyl or aminocarbonyl N-substituted by a $C_1$-$C_{20}$hydrocarbon radical, —$OR^{26}$— is a direct bond or $R^{26}$ is ethylene which is unsubstituted or substituted by $C_1$-$C_{16}$alkyl, and $X^2$, m, n and o are as defined above.

In particular, $R^{24}$ and $R^{25}$ are independently of the other a radical of the formula

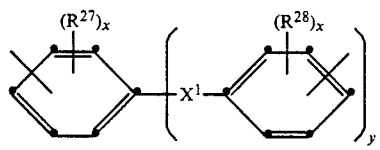

wherein $X^1$ is a direct bond, $C_1$-$C_4$alkylene, $C_2$-$C_{12}$alkylidene, $C_5$-$C_8$cycloalkylidene, —O—, —S—, —SO—, —$SO_2$—, —CO—, —$CO_2$—, —CO—, —$CO_2$—, —N(-$C_1$-$C_4$alkyl)— or —$Si(CH_3)_2$—, $R^{27}$ and $R^{28}$ are independently of the other H, halogen, $C_1$-$C_4$alkyl or $C_1$-$C_4$alkoxy, x is 0, 1 or 2 and y is 0 or 1.

$R^{24}$ and $R^{25}$ are most especially the radical

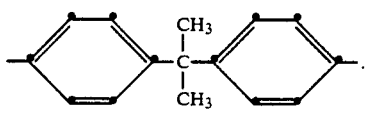

In a preferred embodiment, —$OR^{23}$— is a direct bond, $X^2$ is Cl, m is a number from 1 to 4, n is 0 or a number from 1 to 8, o is a number from 1 to 9 and n+o=2m+1.

In an especially preferred embodiment, the group —$C_mH_nX_o^2$ is —$CH_2Cl$, —$CHCl_2$, —$CCl_3$—$CHClC$-$H_3$—$CCl_2CH_3$, —$CHCl$—$CH_2Cl$, —$CCl_2$—$CH_2Cl$, —$CHCl$—$CHCl_2$, —$CCl_2$—$CHCl_2$, —$CCl_2$—$CCl_3$, —$CH_2$—$CH_2Cl$, —$CH_2$—$CHCl_2$ or —$CH_2$—$CCl_3$.

The invention further relates to a homopolymer or copolymer which is a homopolymer or copolymer of vinyl alcohol in which the H atom of the secondary OH group is at least partially substituted by a group —Y-$^1$—$C_mH_nX_o^1$, wherein $Y^1$ is —CO— or —$R^2$-$^6$—O—CO—, X1 is Cl, Br or I, m is a number from 1 to 12, n is 0 or a number from 1 or 24, o is a number from 1 to 25 and n+o=2m+1, $R^{26}$ being ethylene which is unsubstituted or substituted by $C_1$-$C_{16}$alkyl.

It is preferred to use a homopolymer or copolymer in which the copolymer contains
a) 90 to 0.1 mol % of structural units of formula VII

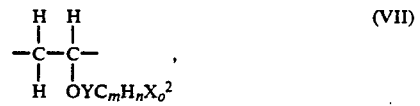

and b) 99.9 to 10 mol % of identical or different structural units of formula VIII

wherein $Y^1$ is —CO— or —$R^{26}$—O—CO—, $R^{26}$ being ethylene which is unsubstituted or substituted by $C_1$-$C_{16}$-alkyl; $X^2$ is Cl, Br or I; m is a number from 1 to 12 n is 0 or a number from 1 to 24, o is a number from 1 to 25 and n+o=2m+1; $R^{19}$ is H, $C_1$-$C_6$alkyl or —$COOR^{23}$; $R^{20}$ is H, F, Cl, CN or $C_1$-$C_6$alkyl; and $R^{29}$ is H, F, Cl, CN, OH, $R^{23}O$—, $C_1$-$C_{12}$alkyl, —$COOR^{23}$, —O—CO—$R^{23}$, —$OR^{22}OH$ or phenyl, $R^{23}$ being $C_1$-$C_{18}$ alkyl, $C_5$-$C_7$cycloalkyl, ($C_1$-$C_{12}$alkyl)-$C_5$-$C_7$-cycloalkyl, phenyl, ($C_1$-$C_{12}$alkyl)phenyl, benzyl or ($C_1$-$C_{12}$alkyl)benzyl and $R^{22}$ being ethylene which is unsubstituted or substituted by $C_1$-$C_{16}$ alkyl.

In a preferred embodiment, $Y^1$ is —CO—, —$CH_2C$-$H_2O$—CO— or —$CH_2CH(CH_2)O$—CO—; $X^2$ is Cl; m is a number from 1 to 6, n is 0 or a number from 1 to 12, o is a number from 1 to 13 and n+o=2m+1; $R^{19}$ and $R^{20}$ are H; and $R^{29}$ is H, F, Cl, CN, OH, $R^{23}O$—, $C_1$-$C_4$alkyl, —$COOR^{23}$, —O—CO—$R^{23}$, phenyl, —$OCH_2C$-$H_2OH$ or —$OCH_2CH(CH_3)OH$, $R^{23}$ being $C_1$-$C_6$alkyl, $C_5$ or $C_6$cycloalkyl, phenyl or benzyl.

Preferably, $X^2$ is Cl, m is a number from 1 to 4, n is 0 or a number from 1 to 8, o is a number from 1 to 9 and n+o=2m+1. The group —$C_mH_nX_o^2$ is especially —$CH_2Cl$, —$CH_2Cl$, —$CHCl_2$, —$CCl_3$, —$CHClCH_3$, —$CCl_2CH_3$—$CHCl$—$CH_2Cl$, —$CCl_2$—$CH_2Cl$, —$CH$-$Cl$—$CHCl_2$—$CCl_2$—$CHCl_2$, —$CCl_2$—$CCl_3$, —$CH$-$_2$—$CH_2Cl$, —$CH_2$—$CHCl_2$ or —$CH_2$—$CCl_3$.

In other respects, the preference indicated above for the compositions of the invention apply to the polymers of the invention. It has been found that, in addition to their property of forming CT complexes with the compounds of formulas I and Ia, the polymers can substantially improve the adhesiveness of thermoplastics and thermosets on substrates such as metals, wood, glass and plastics, it being possible to incorporate only small amounts, e.g., up to 5% by weight, of the polymers of the invention into the thermoplastics or thermosets.

The following Examples illustrate the invention in greater detail.

A) Preparatory Examples

EXAMPLES 1-7

Preparation of

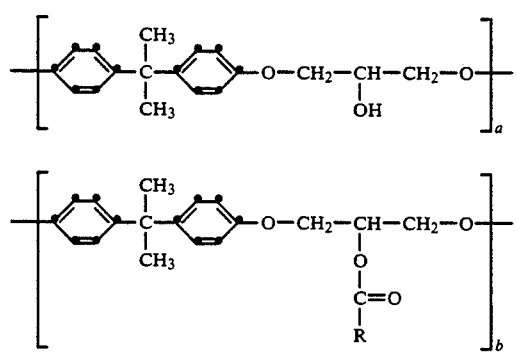

28.4 g of a polyaddition polymer of bisphenol A and bisphenol A diglycidyl ether (Mw=20,000) are dissolvedin 200 ml of dimethylformamide and 60 ml of pyridine. 12.1 g of chloroacetyl chloride are added dropwise at 0° C., with stirring and with the exclusion of moisture. Stirring is continued for 8 hr at room temperature and the product is precipitated in water. The isolated polymer of Example 3 is dried at 80° C. under high vacuum. The content of incorporated chloroacetic acid ester radicals is determined from the elemental analysis.

The polymers in Table 1 are prepared in analogous manner.

TABLE 1

| Example no. | R | n (calculated) $\left(n = \frac{b}{a+b}\right)$ | n (found) $\left(n = \frac{b}{a+b}\right)$ | Tg (°C.) | $\overline{M}_w{}^{1)}$ |
|---|---|---|---|---|---|
| 1 | —CH$_2$Cl | 0,1 | 0,05 | | 44100 |
| 2 | —CH$_2$Cl | 0,5 | 0,25 | 104 | 26500 |
| 3 | —CH$_2$Cl | 1,0 | 0,75 | 83 | 26600 |
| 4 | —CCl$_3$ | 0,1 | 0,05 | | 79000 |
| 5 | —CCl$_3$ | 1,0 | 1,0 | 66 | 94000 |
| 6 | —CHCl—CH$_2$Cl | 0,1 | 0,03 | 102 | 65000 |
| 7 | —CHCl—CH$_2$Cl | 0,5 | 0,25 | | 18000 |

[1])Determined by gel permeation chromatography

EXAMPLE 8

27.8 g (0.19 mol) of glycidyl methacrylate and 122.92 g (1.08 mol) of ethyl methacrylate are heated to 70° C. in 600 ml of dioxane, under nitrogen and with stirring, and 750 mg of AiBN are added. After 16 h, the polymer formed is isolated by precipitation in ice water.

Yield: 130.57 g (87%), epoxy content: 1.27 meq/g (theoretical: 1.267 meq/g), M=86,000.

7.87 g of polymer (10 mmol of epoxy groups) are dissolved in 80 ml of dioxane, and 0.8 ml (0.01 mol) of chloroacetyl chloride and 2.4 ml of pyridine are added dropwise at room temperature. When the addition is complete, the mixture is heated for 1 h at 50° C. and then left to cool and the polymer is isolated by precipitation in diethyl ether. $\overline{M}_2$=32,700, $T_g$: 78° C., chlorine content: 6.54% (calculated: 7.86%).

EXAMPLE 9

The procedure is as in Example 8, except that 0.005 mol of benzoyl chloride is used instead of chloroacetyl chloride.

$\overline{M}_2$=17,300, Tg: 92° C., chlorine content: 1.2% (calculated: 2.1%).

Reaction with carboxylic acids

EXAMPLE 10

7.87 g (0.01 mol of epoxy groups) of poly(ethyl methacrylate/glycidyl methacrylate—85/15), prepared by the process according to Example 8, are dissolved in 100 ml of dioxane, and 1.71 g (0.01 mol) of 2,3-dichloropropionic acid and 96 mg of benzyltrimethylammonium chloride are added. After 10 h of reflux, the mixture is left to cool and the converted polymer is isolated by precipitation in ice water.

EXAMPLE 11

The procedure is as in Example 10, except that 0.01 mol of chloroacetic acid is used instead of 2,3-dichloropropionic acid.

$\overline{M}_w$=127,000, $T_g$: 88° C., chlorine content: 1.6% (calculated: 4.02%).

B) Application Examples

EXAMPLES 12-23

1.6 mg of tetraselenotetracene (TSeT) are dissolved in 9 ml of dimethylformamide (DMF) at 120° C. and added to a solution of 100 mg of the polymer according to Example 1 in 1 ml of DMF. The solution is then poured on to a preheated glass plate. A transparent film with a needle network of crystal needles of electrically conducting (TseT)$_2$Cl in a polymer matrix remains after evaporation of the solvent in the temperature range from 90° to 130° C. The films according to Examples 13 to 23 in Tables 2 and 3 are produced in the same way, an additional polymer (polymer 2) also being used in Examples 16 to 23. The conductivity of the films is between 0.1 and 1 S/cm.

TABLE 2

| Example no. | Polymer according to Exammple no. | $\frac{\text{TSeT (mg)}}{\text{Polymer (mg)}} \cdot 100$ | Morphology of the needle network[1)] |
|---|---|---|---|
| 12 | 7 | 1,6 | + |
| 13 | 1 | 1,6 | ++ |
| 14 | 2 | 1,6 | + |
| 15 | 6 | 1,6 | ++ |

[1)]+ extensively homogeneous needle networks (electrically conducting) ++ irregular needle networks (electrically conducting)

TABLE 3

| Example no. | Polymer (1) according to Example no. | Polymer (2) | Polymer (1) in g / Polymer (2) in g | TSeT (mg) | Morphology of the needle network |
|---|---|---|---|---|---|
| 16 | 5 | Polyimide[1] | 0,43 | 1,6 | +[4] |
| 17 | 7 | polyimide[1] | 1 | 1,6 | +[4] |
| 18 | 5 | polyimide[1] | 0,1 | 1,5 | ++ |
| 19 | 7 | polyimide[1] | 0,05 | 1,6 | −[3] |
| 20 | 7 | polyimide[1] | 0,1 | 1,6 | ++ |
| 21 | 1 | Phenoxy-polymer[2] | 1,0 | 1,6 | + |
| 22 | 1 | phenoxy-polymer[2] | 9 | 1,6 | ++ |
| 23 | 1 | phenoxy-polymer[2] | 0,1 | 1,5 | (−) |

[1] polyimide derived from benzophenonetetracarboxylic dianhydride, diaminodurol and 3,3'-dimethyl-5,5'-diethyl-4,4'-diaminodiphenyl-methane ($\overline{M}_w = 40,000$).
[2] polyadduct of bisphenol A and bisphenol A diglycidyl ether ($\overline{M}_w = 20,000$)
[3] short needles, not conducting over their whole surface
[4] opaque sheets (demixing of the polymers)

EXAMPLES 24-27

100 mg of polymer are dissolved in 2 ml of DMF at 120° C. This solution is added, with vigorous stirring, to a hot solution, at 120° C., of 1.6 mg of 2-fluorotetraselenotetracene in DMF and the resulting solution is poured into hot Petri dishes at 100°-140° C. Electrically conducting polymer films remain after evaporation of the solvent. The electrical conductivity is determined by the 4-point method (see Table 4).

TABLE 4

| Example | Polymer according to Example | Conductivity $\Omega$ (Ohm$^{-1}$am$^{-1}$) |
|---|---|---|
| 24 | 8 | 0,21 |
| 25 | 9 | 0,08 |
| 26 | 10 | 0,01 |
| 27 | 11 | 0,12 |

What is claimed is:

1. A homopolymer or copolymer of acrylic or methacrylic acid esters which comprises acrylic or methacrylic acid ester monomer residues wherein the —O— atom of the ester functional group is bonded to a moiety of the formula —$R^{22}$—O—CO—$C_mH_nX_o^2$ wherein m is a number from 1 to 12, n is 0 or a number from 1 to 24, o is a number from 1 to 25 and n+o=2m+1, $X^2$ is Cl, Br or I and $R^{22}$ is $C_2$-$C_{12}$alkylene, $C_4$-$C_{12}$alkylene, $C_4$-$C_{12}$cycloalkylene, $C_4$-$C_{12}$cycloalkylene—$CH_2$—, $C_2$-$C_{12}$cycloalkylene—$(CH_2)_2$—, benzylene or xylylene which are unsubstituted or substituted by OH, Cl, Br or phenyl.

2. A homopolymer or copolymer according to claim 1 which comprises
   a) 0.1 to 100 mol % of at least one structural unit of formula III

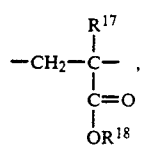

and
   b) 0 to 99.9 mol % of at least one structural unit of formula IV

based on the polymer, wherein $R^{17}$ is H or methyl; $R^{18}$ is a radical —(—$R^{22}$—O—)$_z$—$CO_2C_mH_nX_o^2$, wherein z is 1, m is a number from 1 to 12, n is 0 or a number from 1 to 24, o is a number from 1 to 25 and n+o=2m+1, $X^2$ is Cl, Br or I and $R^{22}$ is $C_2$-$C_{12}$alkylene, $C_4$-$C_{12}$cycloalkylene, $C_4$-$C_{12}$cycloalkylene—$CH_2$—, $C_2$-$C_{12}$cycloalkylene—(—$CH_2$—)$_2$, benzylene or xylylene which is unsubstituted or substituted by OH, Cl, Br or phenyl; $R^{19}$ is H, $C_1$-$C_6$alkyl or.—COOR$^{23}$; $R^{20}$ is H, F, Cl, CN or $C_1$-$C_6$alkyl; and $R^{21}$ is H, F, Cl, CN, $R^{23}$—O—, $C_1$-$C_{12}$alkyl, —COOR$^{23}$, —O—CO—$R^{23}$, —COOR$^{22}$—OH,

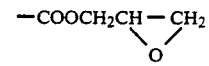

or phenyl, $R^{22}$ being as defined above and $R^{23}$ being $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)phenyl, benzyl or ($C_1$-$C_{12}$alkyl)benzyl.

3. A homopolymer or copolymer according to claim 1, wherein $R^{17}$ is methyl; $R^{18}$ is a radical —$R^{22}$—O—CO—$C_mH_nX_o^2$, wherein m is a number from 1 to 6, n is 0 or a number from 1 to 12, o is a number from 1 to 13 and n+o=2m+1, $X^2$ is Cl and $R^{22}$ is $C_2$-$C_6$alkylene, cyclopentylene, cyclohexylene, cyclopentylene—$CH_2$—, cyclohexylene—(—$CH_2$—)— or cyclohexylene—$CH_2$—$_2$ which is unsubstituted or substituted by OH or Cl; $R^{19}$ is H; $R^{20}$ is H, F, Cl or $C_1$-$C_4$alkyl; and $R^{21}$ is H, F, Cl, CN, $R^{23}$—O—, $C_1$-$C_6$alkyl, —COOR$^{23}$, —O—CO—$R^{23}$, —COOR$^{22}$—OH,

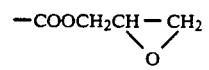

or phenyl, $R^{22}$ being as defined above and $R^{23}$ being $C_1$-$C_6$alkyl, $C_5$ or $C_6$cycloalkyl, phenyl or benzyl.

4. A homopolymer or copolymer according to claim 1, wherein $R^{22}$ is linear or ranched $C_2$-$C_6$alkylene, $X^2$ is Cl, m is a number from 1 to 4, n is 0 or a number from 1 to 8, o is a number from 1 to 9 and $n+o=2m+1$.

5. A homopolymer or copolymer according to claim 4, wherein the group $-C_mH_nX_o^2$, in the radical $-R^{22}-O-CO-C_mH_nX_o^2$, is $-CH_2Cl$, $-CHCl_2$, $-CCl_3$, $-CHClCH_3$, $-CCl_2CH_3-CHCl-CH_2Cl$, $-CCl_2-CH_2Cl$, $-CHCl-CHCl_2$, $-CCl_2-CHCl_2$, $-CCl_2-CCl_3$, $-CH_2-CH_2Cl$, $-CH_2-CHCl_2$ or $-CH_2-CCl_3$.

6. A homopolymer or copolymer of claim 2 wherein $R^{22}$ is linear or branched alkylene containing 2 to 6 carbon atoms or cyclohexylene and $R^{22}$ is unsubstituted or substituted by OH or Cl.

7. A homopolymer or copolymer of claim 2 wherein $R^{17}$ is methyl, m is a number from 1 to 4, n is 0 or a number from 1 to 8, o is a number from 1 to 13, $X^2$ is Cl and $R^{22}$ is linear $C_2$-$C_6$alkylene or $-CH_2CHOHCH_2-$, $R^{19}$ and $R^{20}$ are H, $R^{21}$ is $-COOR^{22}OH$ or $-COOR^{23}$ and $R^{23}$ is $C_1$-$C_6$alkyl.

8. A homopolymer or copolymer of claim 2 wherein $R^{22}$ is linear or branched $C_2$-$C_6$alkylene, cyclopentylene or cyclohexylene, $R^{19}$ is H, $R^{20}$ is H or methyl, $R^{21}$ is $-COOR^{23}$ or $-COOR^{22}OH$ and $R^{23}$ is $C_1$-$C_6$alkyl, cyclopentyl or cyclohexyl.

9. A homopolymer or copolymer of claim 2 which consists essentially 20 to 100 mol % of structural units of formula III and 0 to 80 mol % of structural units of formula IV.

10. A homopolymer or copolymer of claim 9 wherein $R^{22}$ is a linear or branched alkylene containing 2 to 6 carbon atoms or cyclohexylene and $R^{22}$ is unsubstituted or substituted by OH or Cl.

11. A homopolymer or copolymer of claim 9 wherein $R^{17}$ is methyl, m is a number from 1 to 4, n is 0 or a number from 1 to 8, o is a number from 1 to 9, $X^2$ is Cl and $R^{22}$ is linear $C_2$-$C_6$alkylene or $-CH_2CHOHCH_2-$, $R^{19}$ and $R^{20}$ are H, $R^{21}$ is $-COOR^{22}OH$ or $-COOR^{23}$ and $R^{23}$ is $C_1$-$C_6$alkyl.

12. A homopolymer or copolymer of claim 9 wherein $R^{22}$ is linear or branched $C_2$-$C_6$alkylene, cyclopentylene or cyclohexylene, $R^{19}$ is H, $R^{20}$ is H or methyl, $R^{21}$ is $-COOR^{23}$ or $-COOR^{22}OH$ and $R^{23}$ is $C_1$-$C_6$alkyl, cyclopentyl or cyclohexyl.

13. A homopolymer or copolymer of claim 9 which consists essentially of 30 to 100 mol % of structural units of formula III and 0 to 70 mol % of structural units of formula IV.

* * * * *